(12) United States Patent
Ishida

(10) Patent No.: US 7,686,123 B2
(45) Date of Patent: Mar. 30, 2010

(54) STRADDLE-TYPE VEHICLE WITH BELT TYPE CONTINUOUSLY VARIABLE TRANSMISSION HAVING RESIN-BLOCK-TYPE BELT

(75) Inventor: Yousuke Ishida, Shizuoka (JP)

(73) Assignee: Yamaha Hatsudoki Kabushiki Kaisha, Shizuoka-ken (JP)

( * ) Notice: Subject to any disclaimer, the term of this patent is extended or adjusted under 35 U.S.C. 154(b) by 238 days.

(21) Appl. No.: 12/020,083

(22) Filed: Jan. 25, 2008

(65) Prior Publication Data

US 2008/0210484 A1    Sep. 4, 2008

(30) Foreign Application Priority Data

Jan. 26, 2007    (JP) .............................. 2007-016497

(51) Int. Cl.
  *B60K 17/342*    (2006.01)
  *B60K 17/36*    (2006.01)

(52) U.S. Cl. ..................... 180/346; 180/68.1; 180/68.2; 180/219; 180/311; 180/312; 180/366; 474/93; 474/144; 474/146; 477/37; 477/44; 454/69; 454/121; 454/143; 454/906

(58) Field of Classification Search ................ 180/68.1, 180/68.2, 219, 311, 312, 366, 346; 474/93, 474/144, 146; 477/37, 44; 454/69, 121, 454/143, 906
See application file for complete search history.

(56) References Cited

U.S. PATENT DOCUMENTS

| | | | | |
|---|---|---|---|---|
| 1,938,801 A * | 12/1933 | Bourne et al. ................ | 454/338 |
| 3,623,447 A * | 11/1971 | Jacobson .................. | 114/55.51 |
| 3,741,730 A * | 6/1973 | Alcott .......................... | 422/173 |
| 4,271,809 A * | 6/1981 | Moore et al. ................ | 123/522 |
| 5,171,189 A * | 12/1992 | Douhairet et al. ............ | 474/144 |
| 5,242,332 A * | 9/1993 | Douhairet et al. ............ | 474/146 |
| 5,400,753 A * | 3/1995 | Andress et al. ........... | 123/198 E |
| 5,462,484 A * | 10/1995 | Jung et al. .................... | 454/187 |
| 5,609,658 A * | 3/1997 | Takemura et al. ........... | 55/385.3 |
| 5,671,802 A * | 9/1997 | Rogers ......................... | 165/41 |
| 6,290,016 B1 * | 9/2001 | Umeoka ...................... | 180/219 |
| 6,415,857 B1 * | 7/2002 | Nakamura et al. .......... | 165/204 |
| 6,938,676 B2 * | 9/2005 | Lan et al. ...................... | 165/41 |
| 7,059,438 B1 * | 6/2006 | Sheets ........................ | 180/68.1 |
| 7,162,992 B2 * | 1/2007 | Kobayashi et al. ........ | 123/198 E |
| 7,357,110 B2 * | 4/2008 | Hashimoto et al. ...... | 123/184.47 |
| 7,363,999 B2 * | 4/2008 | Hastings ...................... | 180/220 |
| 7,387,652 B2 * | 6/2008 | Studer .......................... | 55/338 |
| 7,427,248 B2 * | 9/2008 | Chonan ........................ | 474/93 |

(Continued)

FOREIGN PATENT DOCUMENTS

JP    2002-147582    5/2002

*Primary Examiner*—Paul N. Dickson
*Assistant Examiner*—Barry Gooden, Jr.
(74) *Attorney, Agent, or Firm*—Rabin & Berdo, PC

(57) ABSTRACT

A noise suppressor for a straddle-type vehicle provided with a belt type continuously variable transmission having a resin-block-type belt. A portion of an air passage for guiding air to a belt chamber is formed in a closed casing. The closed casing includes a dish-shaped first casing member and a dish-shaped second casing member. An inlet port and an exhaust port are formed in the second casing member. Partition walls in the form of curved plate pieces are formed in the first casing and second casing members. Air flow paths formed by the partition walls are U-shaped, thereby forming a serpentine flow.

14 Claims, 8 Drawing Sheets

U.S. PATENT DOCUMENTS

| | | | |
|---|---|---|---|
| 2003/0042070 A1* | 3/2003 | Brandt et al. | 181/256 |
| 2003/0150624 A1* | 8/2003 | Rummel | 169/43 |
| 2004/0224806 A1* | 11/2004 | Chonan | 474/93 |
| 2006/0046632 A1* | 3/2006 | Goupil et al. | 454/121 |
| 2006/0046633 A1* | 3/2006 | Goupil et al. | 454/121 |
| 2006/0090942 A1* | 5/2006 | Hastings | 180/68.1 |
| 2006/0270503 A1* | 11/2006 | Suzuki et al. | 474/144 |
| 2007/0023217 A1* | 2/2007 | Ishida et al. | 180/219 |
| 2007/0023220 A1* | 2/2007 | Ishida et al. | 180/229 |
| 2008/0121455 A1* | 5/2008 | Ishida | 180/219 |
| 2008/0308337 A1* | 12/2008 | Ishida | 180/230 |
| 2008/0314676 A1* | 12/2008 | Ishida | 180/366 |

* cited by examiner

Fig. 8
(a)
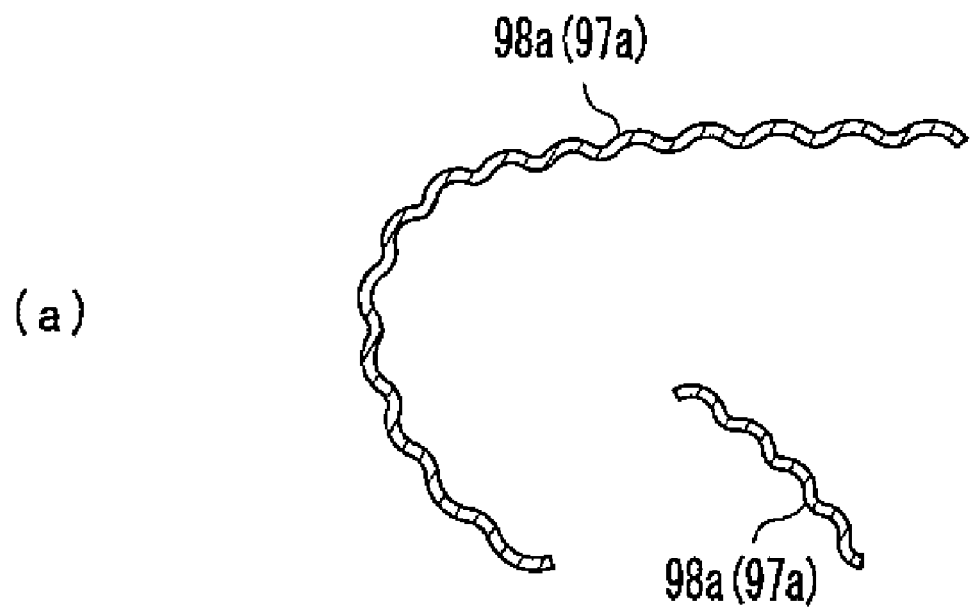
(b)
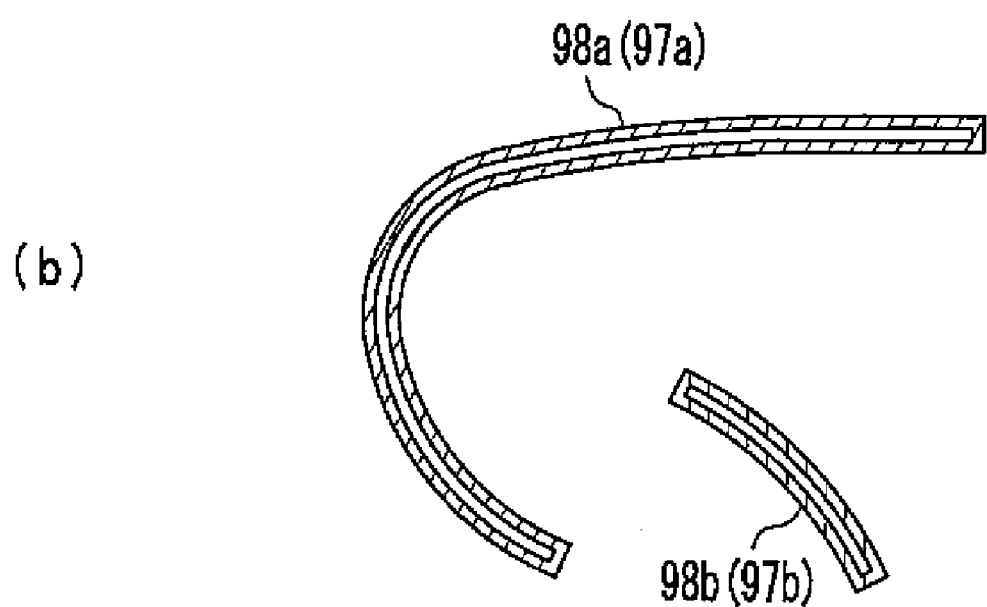

STRADDLE-TYPE VEHICLE WITH BELT TYPE CONTINUOUSLY VARIABLE TRANSMISSION HAVING RESIN-BLOCK-TYPE BELT

RELATED APPLICATIONS

This application claims the benefit of priority under 35 USC 119 of Japanese patent application no. 2007-016497, filed on Jan. 26, 2007, which application is hereby incorporated by reference in its entirety.

BACKGROUND OF THE INVENTION

1. Field of the Invention

The present invention relates to a straddle-type vehicle provided with a belt type continuously variable transmission (CVT) having a resin-block-type belt.

2. Description of Related Art

Straddle-type vehicles, such as a motorcycle, provided with a belt type CVT are known (see JP-A-2002-147582, for example).

A belt type CVT includes a V-belt wound around a primary sheave and a secondary sheave. Driving force of an engine is transmitted via a crankshaft to the primary sheave, the V-belt, and the secondary sheave in this order to change a speed ratio, and is thereafter transmitted to drive wheels. The primary sheave, the V-belt, and the secondary sheave are housed in a belt chamber defined in a transmission casing.

In the motorcycle of JP-A-2002-147582, a resin-block-type belt is employed as a V-belt to improve durability of the V-belt and to prevent heat liberation due to deformation of the V-belt. The resin-block-type belt includes a number of resin blocks and a coupling member for coupling the resin blocks. However, being independent of each other, the resin blocks are likely to collide with each other as the belt runs. Accordingly, the resin-block-type belt is prone to make more noise relative to a rubber belt.

To this end, in order to suppress noise, JP-A-2002-147582 proposes providing a sound absorber on an inner surface of a transmission casing that accommodates the resin-block-type belt.

The V-belt, and the primary and secondary sheaves wound by the V-belt rotate at a high speed. This necessitates locating the sound absorber so as not to come into contact with the V-belt or sheaves. In other words, the sound absorber must be positioned away from the V-belt and sheaves by a certain distance. Accordingly, when the sound absorber is provided on an inner surface of a transmission casing, as in JP-A-2002-147582, space in the transmission casing for the sound absorber must be secured in advance. However, securing additional space for the sound absorber increases the volume of the belt chamber. Thus, the motorcycle of JP-A-2002-147582 has a disadvantage in increased size of the continuously variable transmission.

In addition, sound absorbers generally have heat-retaining properties. Accordingly, the temperature inside the belt chamber in which a sound absorber is provided on the inner surface of the transmission casing easily rises. This leads to another problem in that, as the temperature of the belt chamber rises, the durability of the resin-block-type belt decreases.

SUMMARY OF THE INVENTION

The present invention has been made in light of these circumstances and provides a noise suppressor appropriate for a straddle-type vehicle provided with a belt type continuously variable transmission having a resin-block-type belt.

The present invention provides a straddle-type vehicle including an engine unit having an engine, a belt type continuously variable transmission (CVT) having a resin-block-type belt, and a transmission casing defining a belt chamber for accommodating the CVT. An air passage either guides air into or vents air out of the belt chamber. The air passage includes a closed casing in which an inlet port and an exhaust port are formed. One or more partitions each projecting out of an inner wall of the closed casing toward an inside of the closed casing and having opposite side surfaces extending in a direction intersecting with a projecting direction of the partition are provided. A flow path is formed on each side of the partition. Flow directions of the flow paths are opposite from each other. The flow paths form a curved flow path that runs from the inlet port to the exhaust port in the closed casing.

In the straddle-type vehicle, the air passage includes the closed casing and the partition that forms the curved flow path in the closed casing. When a flow path is curved inside the closed casing as described above, the flow path can be formed long in a confined space. Accordingly, noise produced by the resin-block-type belt in the belt chamber is effectively reduced in the closed casing before escaping outside.

From a viewpoint of smooth air flow for inducing and exhausting air without stagnation, an air flow path is preferably not curved. Nevertheless, in the closed casing of the straddle-type vehicle, a curved flow path is intentionally formed using the partitions. This structure inhibits rectilinear propagation of and suppresses leakage of high-frequency sound waves produced by the resin-block-type belt to the outside of the belt chamber. Thus, the straddle-type vehicle favorably suppresses noise produced by the resin-block-type belt.

The present invention provides a noise suppressor appropriate for a straddle-type vehicle provided with a belt type continuously variable transmission having a resin-block-type belt.

Other features and advantages of the invention will be apparent from the following detailed description, taken in conjunction with the accompanying drawings which illustrate, by way of example, various features of embodiments of the invention.

BRIEF DESCRIPTION OF THE DRAWINGS

FIGS. 8(a) and 8(b) are cross-sectional views of partition walls according to modified embodiments of the invention.

DETAILED DESCRIPTION OF THE INVENTION

The inventor has conducted extensive studies to suppress noise produced by a belt type continuously variable transmission having a resin-block-type belt, and found that a major portion of the noise is a high-frequency sound wave, which is high-pitched noise produced by the resin-block-type belt. The inventor has also directed his attention to the fact that a high-frequency sound wave is likely to propagate rectilinearly and have low transmittance.

Based on the study of the cause of the noise, the inventor has examined relationships between the air passage for cooling the belt chamber and reduction of the high-frequency sound wave, and made the present invention.

Preferred embodiments of the present invention are now described with reference to the drawings.

First Embodiment

Schematic Structure of Motorcycle 1

Figure 1:
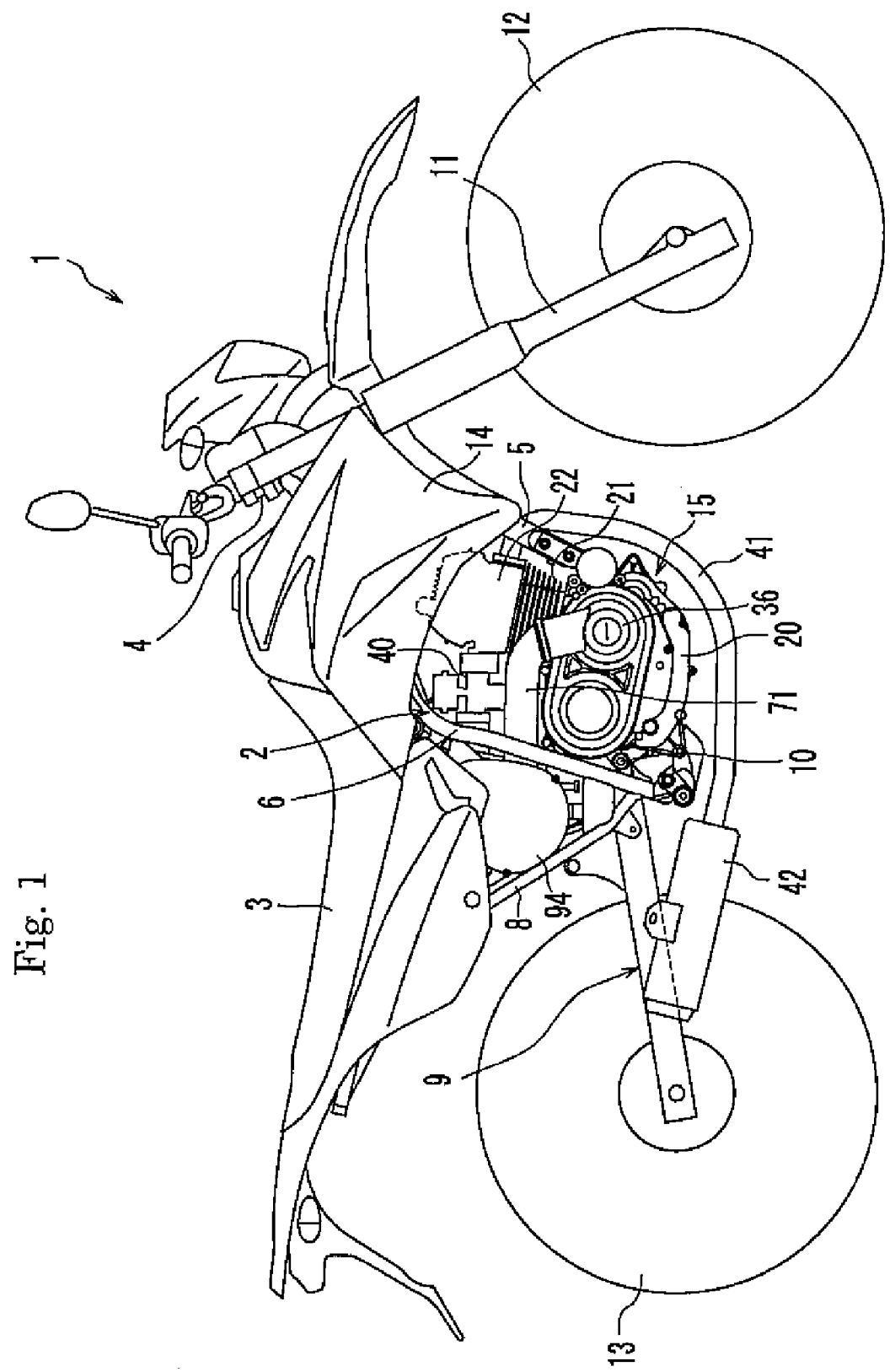
FIG. 1 is a side view of a motorcycle according to an embodiment of the present invention.

As shown in FIG. 1, a straddle-type vehicle according to a first embodiment of the invention is a motorcycle 1. Motorcycle 1 includes a body frame 2 and a seat 3 on which a passenger is to be seated. While motorcycle 1 as illustrated is an off-road motorcycle, the invention is not limited to an off-road motorcycle and may be another type such as a motorcycle-type, scooter-type or moped-type, for example. Forward, rear, left and right directions in the following description are from the perspective of a passenger seated on seat 3.

Components Around Body Frame 2

Figure 2:
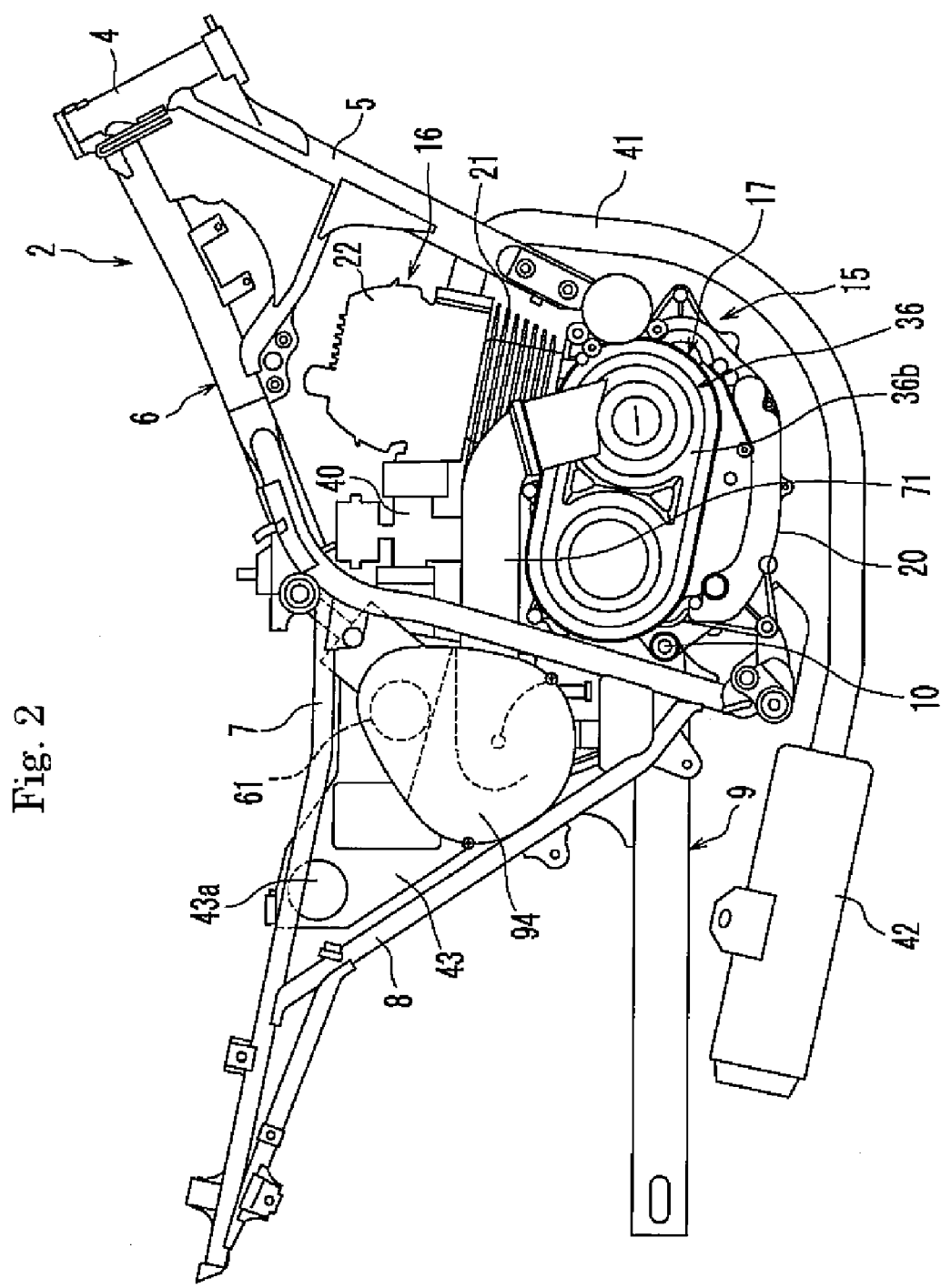
FIG. 2 is a right side view of a portion of the motorcycle.

As shown in FIG. 2, body frame 2 includes a down tube 5 extending downward from a head pipe 4, and a main tube 6 extending above down tube 5 rearward from head pipe 4. Main tube 6 is bifurcated midway to the right and to the left, and is curved rearward of the bifurcated portion to extend downward.

Left and right seat rails 7 are connected to main tube 6 near the curved section and extend rearward. Lower ends of seat rails 7 are connected to ends of a backstay 8. The other ends of backstay 8 are connected to lower bifurcated ends of main tube 6. A rear arm 9 is coupled to the lower ends of main tube 6 with a pivot shaft 10 therebetween.

A lower end of head pipe 4 is connected to a front fork 11. As shown in FIG. 1, a front wheel 12 is coupled to front fork 11, and a rear wheel 13 is coupled to a rear end of rear arm 9. A cover 14 covers body frame 2. Seat 3 is slightly rearward from a center of cover 14.

Figure 3:
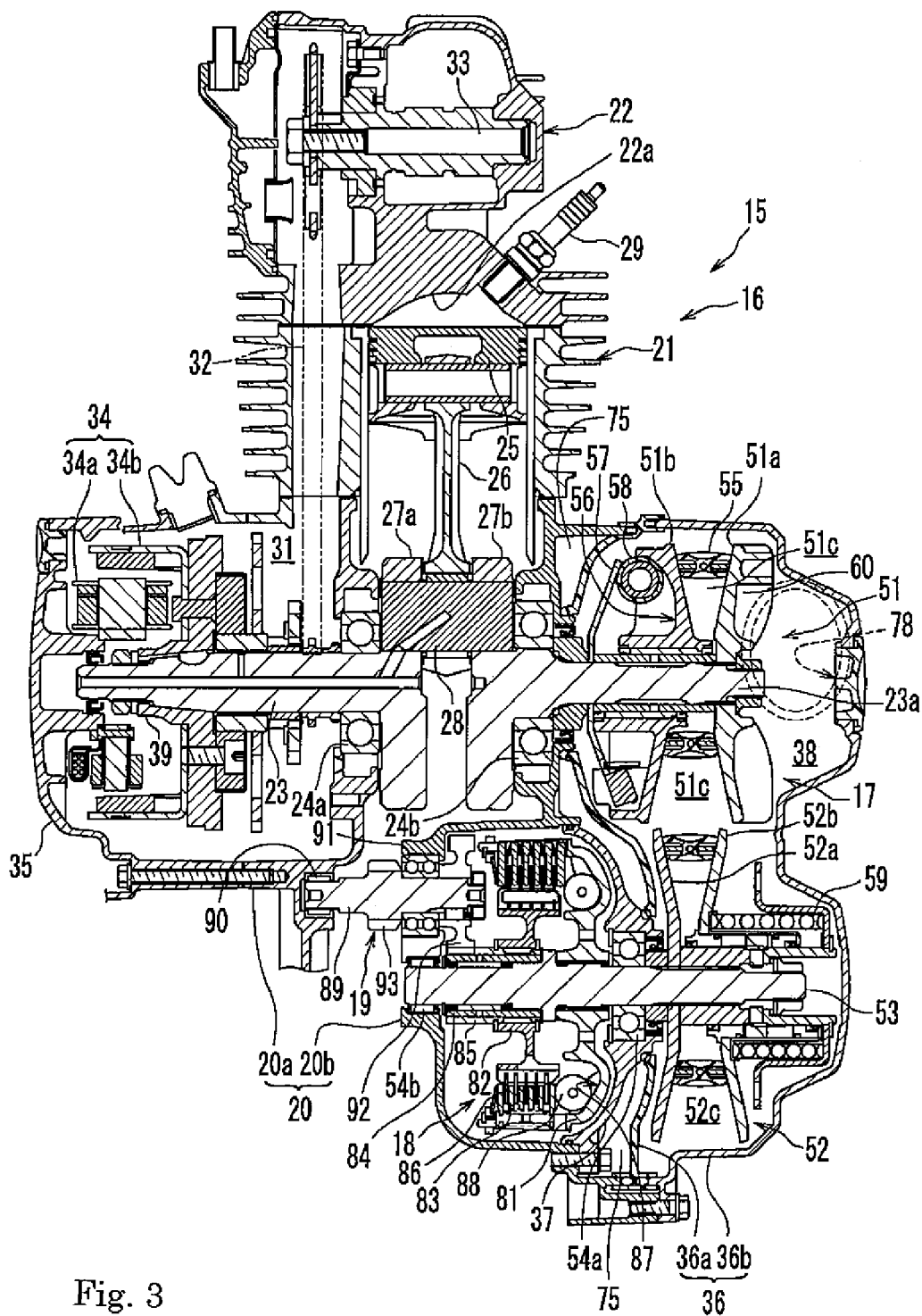
FIG. 3 is a cross-sectional view of an engine unit of the motorcycle.

As shown in FIG. 2, an engine unit 15 is attached to and suspended from down tube 5 and main tube 6 to be positioned therebetween. As shown in FIG. 3, engine unit 15 is formed by integrating an engine 16, a belt type continuously variable transmission (CVT) 17, and the like together. Driving force generated in engine unit 15 is transmitted to rear wheel 13 via a power transmission mechanism such as a chain belt.

Structure of Engine Unit 15

As shown in FIG. 3, which is a cross-sectional view of engine unit 15, engine unit 15 includes engine 16, CVT 17, a centrifugal clutch 18 and a reduction mechanism 19. Engine 16 is described as a four-cycle single-cylinder engine, however, engine 16 may alternatively be, for example, a two-cycle or a multiple cylinder engine.

Engine 16 includes a crankcase 20, a cylinder 21, and a cylinder head 22. Cylinder 21 is attached to crankcase 20. Cylinder head 22 is attached to a distal end of cylinder 21.

A piston 25 is slidably inserted into cylinder 21 and coupled to an end of a connecting rod 26. The other end of connecting rod 26 is coupled to a crank pin 28 provided between a left crank arm 27a and a right crank arm 27b of a crankshaft 23.

A recess 22a, and an inlet port and an exhaust port in communication with recess 22a, are defined in cylinder head 22. An ignition plug 29 is inserted into cylinder head 22.

An intake pipe 40 is connected to the inlet port. As shown in FIG. 2, an air cleaner 43 is connected to a rear end of intake pipe 40. An intake port 43a is formed in air cleaner 43 to induce air from the outside into air cleaner 43.

An exhaust pipe 41 is connected to the exhaust port. As shown in FIG. 2, exhaust pipe 41 extends from cylinder head 22 frontward and obliquely downward toward the right, and then extends rearward in a curved manner passing below a transmission casing 36 of engine unit 15 and extending further rearward. A muffler 42 is connected to a rear end of exhaust pipe 41.

As shown in FIG. 3, a cam chain chamber 31 that connects interiors of crankcase 20 and cylinder head 22 is defined inside cylinder 21 at a left portion thereof. A timing chain 32 provided in cam chain chamber 31 is wound around crankshaft 23 and a cam shaft 33. Cam shaft 33 is provided at a top portion in cylinder head 22 and connected with an intake valve and an exhaust valve. Cam shaft 33 rotates in accordance with rotation of crankshaft 23, which opens or closes the intake and exhaust valves.

Crankcase 20 is split into a first crankcase block 20a on the left and a second crankcase block 20b on the right. First crankcase block 20a and second crankcase block 20b abut along a vehicle width direction. A recess, which is recessed toward the left, is defined in a rear half of second crankcase block 20b. A clutch cover 37 faces and seals the recess. The recess defines a clutch chamber in which centrifugal clutch 18 is provided.

Crankshaft 23 is accommodated in crankcase 20 and extends horizontally in the vehicle width direction. Crankshaft 23 is supported by first crankcase block 20a with a bearing 24a therebetween and supported by second crankcase block 20b with a bearing 24b therebetween.

A generator casing 35 is attached to a left portion of a front half of first crankcase block 20a. Generator casing 35 and first crankcase block 20a define a generator chamber. A generator 34 accommodated in the generator chamber includes a rotor 34b facing a stator 34a. Rotor 34b is fixed to a sleeve 39 that rotates with crankshaft 23. Stator 34a is fixed to generator casing 35. Rotor 34b thereby rotates relative to stator 34a as crankshaft 23 rotates to generate electricity.

Transmission casing 36, which accommodates CVT 17, is attached to the right side of second crankcase block 20b. Transmission casing 36 is independent of crankcase 20, and has an inner casing 36a and an outer casing 36b. Inner casing 36a is attached to the right side of crankcase 30, and outer casing 36b is attached to the right side of inner casing 36a. Inner casing 36a and outer casing 36b define a belt chamber 38 that accommodates CVT 17 therein.

CVT 17 includes a V-belt 55 wound around a primary sheave 51 and a secondary sheave 52. Primary sheave 51 is attached to a right end of crankshaft 23 that extends through second crankcase block 20b and inner casing 36a to belt chamber 38. In the following description, a right portion (more strictly, a portion more right than bearing 24b) of crankshaft 23 is referred to as a "primary sheave shaft 23a."

Primary sheave 51 includes a stationary sheave member 51a facing a movable sheave member 51b. Stationary sheave member 51a is fixed to a right portion of primary sheave shaft 23a. Movable sheave member 51b is located on the left of stationary sheave member 51a and slidably attached to primary sheave shaft 23a.

A belt groove is defined between stationary sheave member 51a and movable sheave member 51b. A cam surface 56 is formed on a left side surface of movable sheave member 51b. A cam plate 57 is provided on the left of cam surface 56. A roller weight 58 is provided between cam surface 56 and cam plate 57.

A plurality of vanes 60 for blowing air are formed on the right portion of stationary sheave member 51a. An intake opening 78 is formed in a portion of outer casing 36b, above vanes 60. An intake duct 71 (see FIG. 2) is connected with intake opening 78.

A secondary sheave shaft 53 is provided in the rear half of crankcase 20. Secondary sheave shaft 53, into which secondary sheave 52 is fitted, extends in parallel with crankshaft 23. Secondary sheave shaft 53 is supported at a right side of its center portion by clutch cover 37 with a bearing 54a therebetween. Secondary sheave shaft 53 is supported at its left end by a left end of second crankcase block 20b with a bearing 54b therebetween. The right end of secondary sheave shaft 53 is coupled to secondary sheave 52.

Secondary sheave 52 includes a stationary sheave member 52a, which is on an inner side in the vehicle width direction, and a movable sheave member 52b, which is on an outer side in the vehicle width direction and opposed to stationary sheave member 52a. A cylindrically-shaped shaft core of stationary sheave member 52a is spline-fitted into secondary sheave shaft 53. A V-shaped belt groove 52c is defined between stationary sheave member 52a and movable sheave member 52b. Movable sheave member 52b is attached to the right portion of secondary sheave shaft 53. Movable sheave member 52b rotates with secondary sheave shaft 53 and is slidable in an axial direction of secondary sheave shaft 53.

A compression coil spring 59 is provided on the right of secondary sheave 52. Compression coil spring 59 urges movable sheave member 52b leftward.

Figure 4:
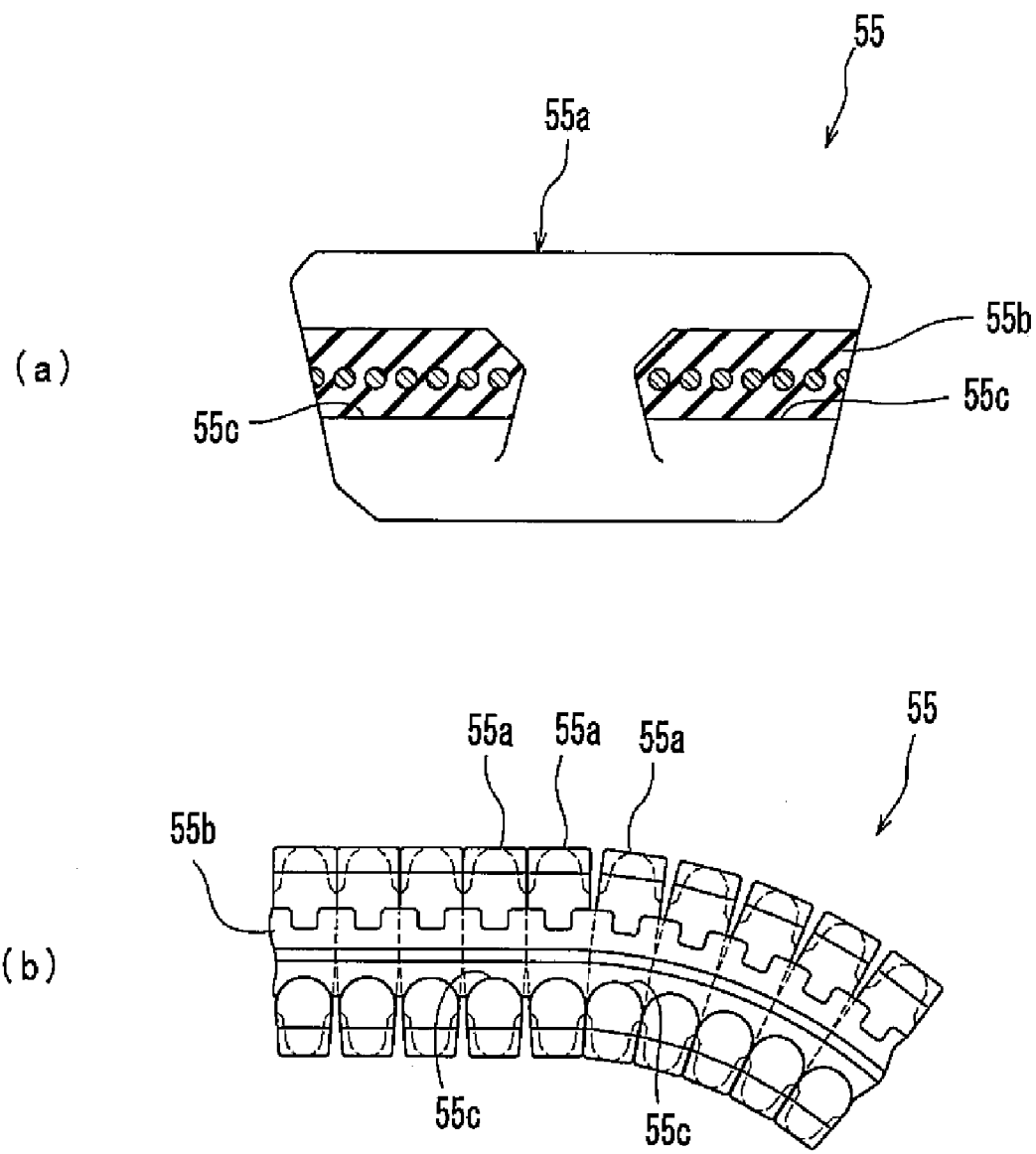
FIG. 4(a) is a cross-sectional view and FIG. 4(b) is a side view of a resin-block-type belt of the motorcycle.

As shown in FIG. 4(a), V-belt 55 includes a plurality of laterally-elongated, H-shaped resin blocks 55(a) and a pair of coupling members 55(b) that couple resin blocks 55(a) together. Each resin block 55(a) is formed into a V-shape bearing a laterally-elongated-H-shaped cross section. Resin blocks 55(a) thus conform to shapes of belt groove 51c in primary sheave 51 and belt groove 52c in secondary sheave 52 (see FIG. 3). A recess 55c, which is recessed toward a center of resin block 55(a), is defined in each side surface of resin block 55. Coupling members 55(b) are fit into recess 55c. As shown in FIG. 4(b), each coupling member 55(b) extends in a direction along which resin blocks 55(a) are aligned.

As shown in FIG. 3, centrifugal clutch 18 is a multiplate wet clutch including a substantially-cylindrical clutch housing 81 and a clutch boss 82. Clutch housing 81 is spline-fitted into secondary sheave shaft 53 to be rotated integrally with secondary sheave shaft 53. A plurality of ring-shaped clutch plates 83 are attached to clutch housing 81. Clutch plates 83 are aligned in the axial direction of secondary sheave shaft 53 and spaced from each other.

A cylindrical gear 85 is peripherally fitted for rotation onto a left portion of secondary sheave shaft 53 with a bearing 84 therebetween. Clutch boss 82 is provided at a position radially inward of clutch plates 83 and radially outward of gear 85 and in mesh with gear 85. Gear 85 thereby rotates with clutch boss 82. A plurality of ring-shaped friction discs 86 is attached to clutch boss 82 at radially outward positions. Friction discs 86 are aligned in an axial direction of secondary sheave shaft 53 and spaced from each other. Each friction disc 86 is positioned between adjacent clutch plates 83, 83.

A plurality of cam surfaces 87 are formed on the left of clutch housing 81. A roller weight 88 is provided between cam surfaces 87 and a rightmost one of clutch plates 83 that faces cam surfaces 87.

Centrifugal clutch 18 is automatically switched between a clutch-in state (engaged state) and a clutch-off state (disengaged state) according to the magnitude of a centrifugal force applied on roller weight 88.

More specifically, when clutch housing 81 rotates at a rotational speed equal to or higher than a predetermined speed, roller weight 88 is moved radially outward by a centrifugal force, thereby pressing clutch plates 83 leftward. This consequently brings clutch plates 83 and friction discs 86 into press-contact with each other and hence into the clutch-in state, in which a driving force is transmitted from secondary sheave shaft 53 to an output shaft 85 via centrifugal clutch 18.

On the other hand, when a rotational speed of clutch housing 81 falls below the predetermined speed, the centrifugal force exerted on roller weight 88 decreases, causing roller weight 88 to move radially inward. This consequently releases the press-contact between clutch plates 83 and friction discs 86, and hence brings clutch plates 83 and friction discs 86 into the clutch-off state, in which a driving force is not transmitted from secondary sheave shaft 53 to output shaft 85. In FIG. 3, a portion below secondary sheave shaft 53 indicates the clutch-in state, and a portion above the same indicates the clutch-off state.

Reduction mechanism 19 is interposed between centrifugal clutch 18 and the output shaft. Reduction mechanism 19 has a speed change shaft 89 situated parallel with secondary sheave shaft 53. Speed change shaft 89 is rotatably supported by first crankcase block 20a with a bearing 90 therebetween and by second crankcase block 20b with a bearing 91 therebetween. A first speed-change gear 92 to be brought into engagement with gear 85 is provided on a right end of speed change shaft 89.

A second speed change gear 93 having a diameter smaller than that of first speed change gear 92 is provided centrally on speed change shaft 89. Second speed change gear 93 is positioned for engagement with the output shaft or a gear provided on the output shaft.

As described above, clutch boss 82 and the output shaft are, coupled together with gear 85, first speed change gear 92, speed change shaft 89, second speed change gear 93, and the like therebetween. Accordingly, as clutch boss 82 rotates, the output shaft rotates. A power transmission mechanism such as a chain for transmitting a driving force from the output shaft to rear wheel 13 is wound around the output shaft. The power transmission mechanism is not limited to a chain, and can be a transmission belt, a gear mechanism formed by combining a plurality of gears, a drive shaft, or a like member.

The structure of engine unit 15 has been described above. Next, the structure of belt chamber 38 for inducing cooling air is described.

Structure of Belt Chamber for Inducing Cooling Air

As shown in FIG. 2, intake duct 71 is connected to and extends upward from a front portion of outer casing 36b of transmission casing 36, and then extends rearward. Intake duct 71 extends to a position rearward of main tube 6. A closed casing 94 is connected to a rear end of intake duct 71.

Closed casing 94 is below seat 3 (FIG. 1) and situated such that an inlet port 61 is at a position higher than pivot shaft 10. Intake duct 71 and closed casing 94 form an air passage for guiding air from the outside into belt chamber 38 (FIG. 3).

Figure 5:
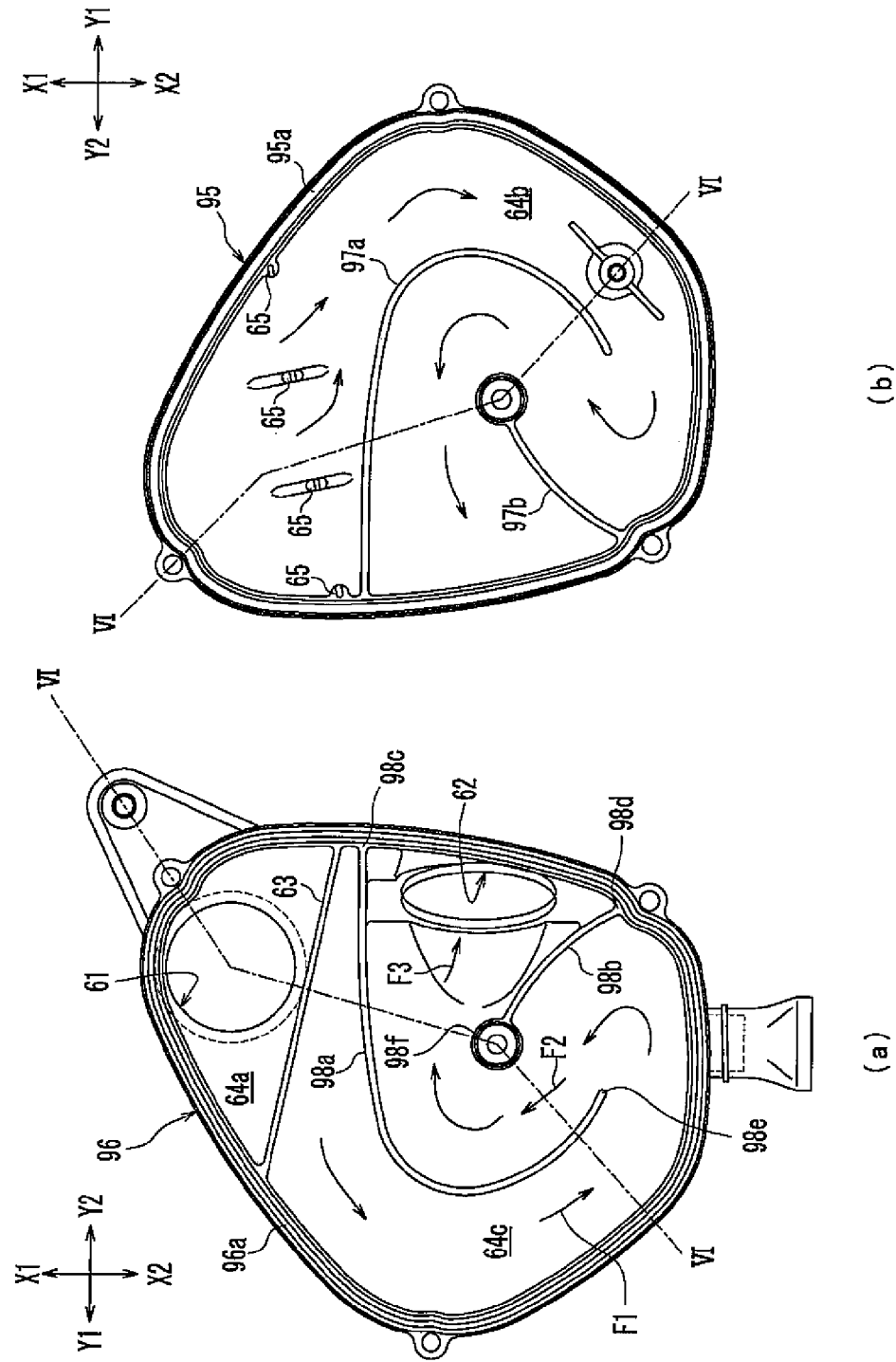
FIGS. 5(a) and 5(b) each are developed views of a casing of the motorcycle.
Figure 6:
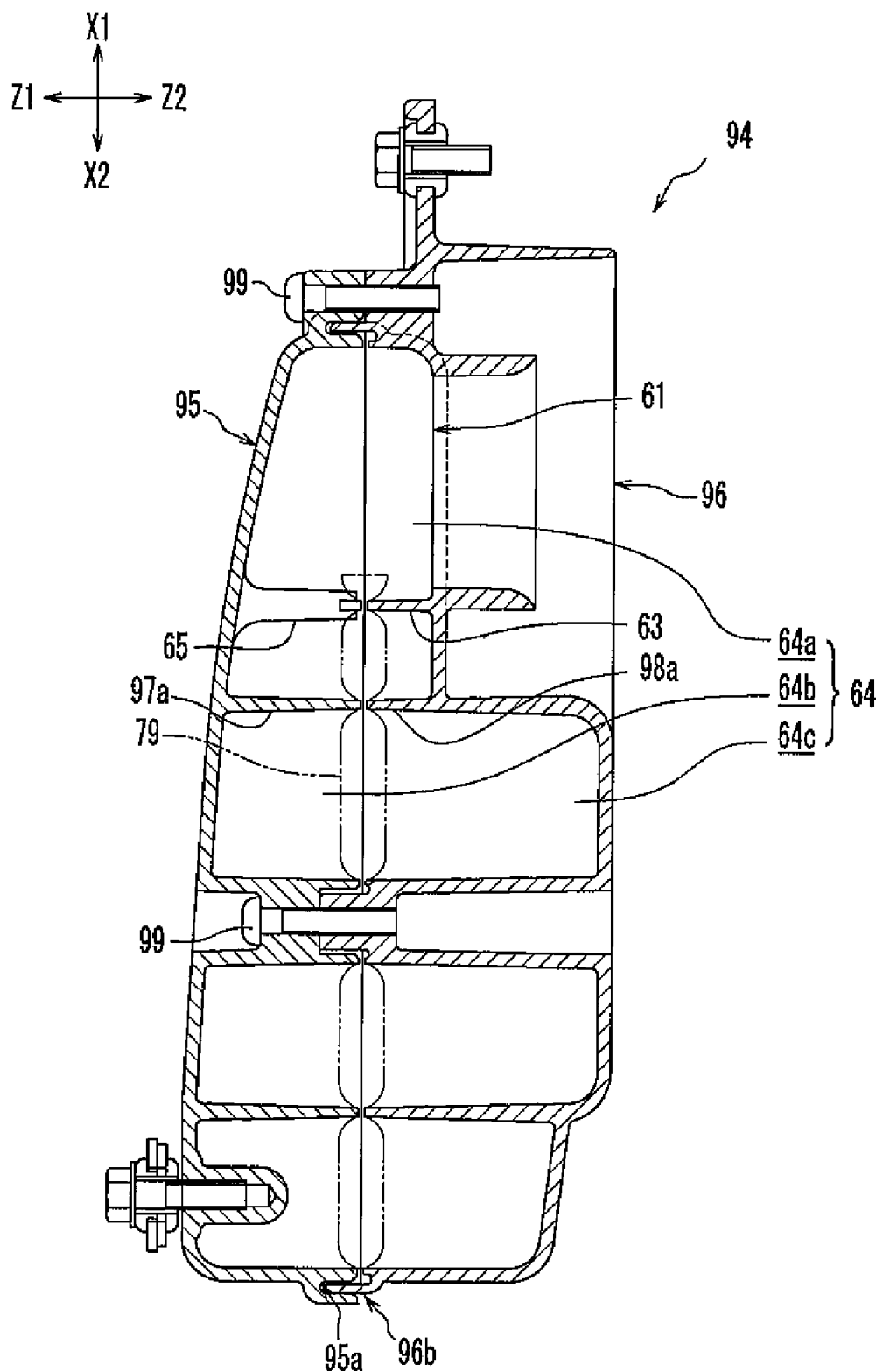
FIG. 6 is a cross-sectional view of the casing.

FIGS. 5(a) and 5(b) are developed views of closed casing 94. FIG. 6 is a cross-sectional view of closed casing 94. For clarity, the directions X1, X2, Y1, Y2, Z1 and Z2 are defined as shown in FIGS. 5(a)-6 with respect to closed casing 94. Straight lines X1-X2, Y1-Y2, and Z1-Z2 intersect at right angles to one another.

As shown in FIG. 6, closed casing 94 is formed with a dish-shaped first casing member 95 and a dish-shaped second casing member 96. As shown in FIGS. 5(a) and 5(b), first casing member 95 and second casing member 96 are shaped such that developed faces thereof conform to each other. As shown in FIG. 6, first casing member 95 and second casing member 96 are aligned in the Z (Z1-Z2) direction and assembled together with conforming faces abutting each other. More specifically, a rib 96a (FIG. 5(a)) provided upright on a periphery of second casing member 96 is fitted into a recess 95(a) (FIG. 5(b)) defined in a periphery of first casing member 95. A bolt 99 fastens first casing member 95 and second casing member 96 together.

As shown in FIGS. 5(a) and 6, inlet port 61 is formed in second casing member 96 centrally in the Z direction and faces first casing member 95. As shown in FIG. 5(a), an exhaust port 62 is formed in second casing member 96 on a side surface facing the Y2 direction.

A partition wall 63 is formed on second casing member 96 at a position spaced from inlet port 61 in the X2 direction. Partition wall 63 partitions second casing member 96 into a space on the inlet port 61 side and a space on the exhaust port 62 side. Partition wall 63 projects out of second casing member 96 toward the inside of closed casing 94 (in the Z1 direction). As shown in FIG. 6, partition wall 63 is formed integrally with second casing member 96. Partition wall 63 and second casing member 96 form an air flow path 64a that extends from inlet port 61 toward first casing member 95.

As shown in FIG. 5(a), partition walls 98a and 98b, each of which is a curved plate piece, are formed integrally with second casing member 96 and project out of second casing member 96 toward the inside of closed casing 94 (in the Z1 direction) (FIG. 6). As shown in FIG. 5(a), partition walls 98a and 98b, and second casing member 96 form an air flow path 64c.

Longitudinal ends 98c and 98d of partition walls 98a and 98b are connected with an inner wall of closed casing 94 as viewed from a projecting (Z1) direction of partition walls 98a and 98b. The other longitudinal ends 98e and 98f of partition walls 98a and 98b are separated from the inner wall of closed casing 94.

Each of partition walls 98a and 98b has side surfaces extending in a direction intersecting with the projecting (Z1) direction. A first flow path F1 that runs from one end 98c of partition wall 98a to its other end 98e is formed on a side of one of the side surfaces of partition wall 98a. A second flow path F2 for guiding air from one end 98d of partition wall 98b to its other end 98f is formed on a side of the other side surface of partition wall 98a. Second flow path F2 is connected with a downstream end of first flow path F1. Flow directions of flow paths F1 and F2 are opposite from each other with partition wall 98a therebetween. Flow paths F1 and F2 form a U-shaped flow path.

A third flow path F3 that runs from the other end 98f of partition wall 98b to the one end 98d is formed on a side of the other side surface of partition wall 98b. Third flow path F3 is connected with a downstream end of second flow path F2. Flow directions of flow paths F2 and F3 are opposite from each other with partition wall 98b therebetween. Thus, flow paths F2 and F3 form a U-shaped flow path.

As described above, air flow path 64c includes U-shaped flow paths, thereby forming a serpentine flow. A bottom (a surface facing the Z2 direction) of second casing member 96 is recessed from a surface of inlet port 61 in the Z2 direction toward exhaust port 62 (FIG. 6). Accordingly, a depth in the Z direction and a cross-sectional area of air flow path 64c increase toward its downstream end (neighborhood of exhaust port 62).

As shown in FIG. 5(b), a support 65 supporting partition wall 63 (see FIG. 5(a)) is formed in first casing member 95. As shown in FIG. 6, support 65 engages with partition wall 63 provided on second casing member 96.

As shown in FIG. 5(b), partition walls 97a and 97b, which are correspondingly shaped to partition walls 98a and 98b (FIG. 5(a)), respectively, are attached to first casing member 95. Partition walls 97a and 97b are formed integrally with first casing member 95 and project out of first casing member 95 toward the inside of closed casing 94 (in the Z2 direction) (FIG. 6).

Partition walls 97a and 97b, and first casing member 95 form an air flow path 64b. As shown in FIG. 6, air flow path 64b is connected with a downstream end of air flow path 64a formed in second casing member 96. Details of partition walls 97a and 97b, curved flow paths formed by the same, and the like are similar to those of partition walls 98a and 98b, and hence repeated descriptions are omitted.

According to the structure, when first casing member 95 and second casing member 96 are assembled together, partition walls 98a and 97a are butt-joined together and partition walls 98b and 97b are butt-joined together. Consequently, air flow paths 64b and 64c are butt-joined. As shown in FIG. 6, air flow paths 64a, 64b, and 64c form an air flow path 64 that guides air from inlet port 61 to exhaust port 62 (see FIG. 5(a)).

As shown in FIG. 6, an air filter 79 for filtering out dust to thereby clean the air is provided between first casing member 95 and second casing member 96 at a position spaced from support 65 in the X2 direction. Air filter 79 is sandwiched by and held between partition walls 97a and 97b, and partition walls 98a and 98b. Air flow path 64 is partitioned at a midway thereof by air filter 79 into air flow path 64b on the inlet port 61 side and air flow path 64c on the exhaust port 62 side.

Structure for Venting Cooling Air Out of Belt Chamber

Next, the structure for venting cooling air out of belt chamber 38 is described.

Figure 7:
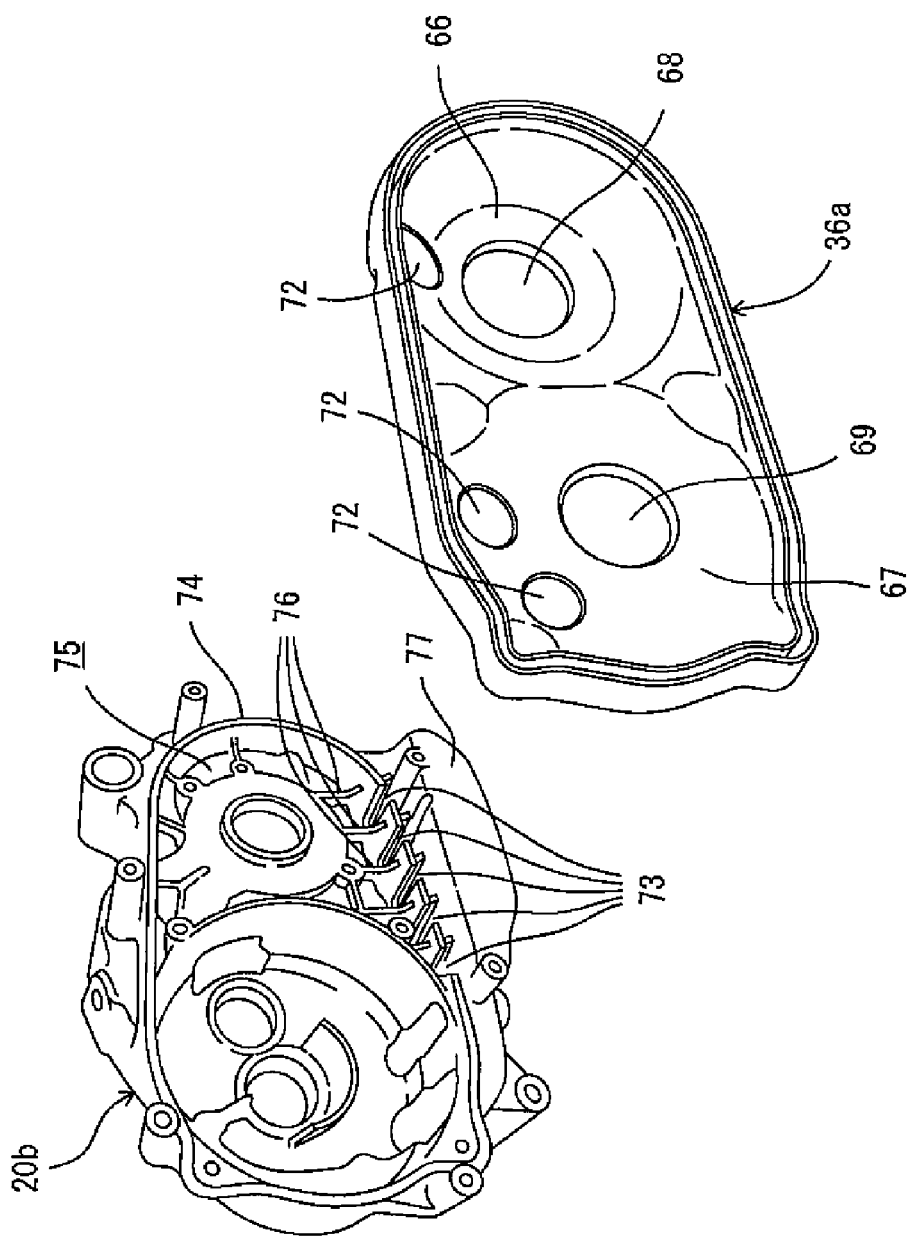
FIG. 7 is a perspective view of a second crankcase block and an inner casing of the motorcycle.

FIG. 7 is a perspective view of second crankcase block 20b and inner casing 36a. As shown in FIG. 7, a front half 66 of inner casing 36a bulges out leftward into a bowl shape, and a rear half 67 of inner casing 36a bulges out rightward into a bowl shape. A hole 68, into which primary sheave shaft 23a of CVT 17 is to be inserted, is defined in front half 66. A hole 69, into which secondary sheave shaft 53 of CVT 17 is to be inserted, is defined in rear half 67. Clutch cover 37 (FIG. 3) interposed between inner casing 36a and second crankcase block 20b is not shown in FIG. 7.

A ventilation hole 72 is defined in inner casing 36a. In the illustrated embodiment, three circular ventilation holes 72 are provided at positions higher than a vertical center of inner casing 36a. No limitation is imposed on the shape or number of ventilation holes 72. The position of ventilation hole 72 is not limited to an upper portion of inner casing 36a. In the embodiment, ventilation holes 72 are provided in both front half 66 and rear half 67 of inner casing 36a. Alternatively, ventilation hole 72 may be provided in just one of front half 66 and rear half 67.

A plurality of ventilation holes 73 are defined in a lower side of a right portion of second crankcase block 20b. Second crankcase block 20b has a rim 74 that stands upright rightward and is correspondingly shaped to an outline of transmission casing 36. A lower side of rim 74 is formed into a partially-notched slits; in other words, formed into a so-called comb-like shape. Accordingly, a space 75 defined by second crankcase block 20b and inner casing 36a is in communication with the exterior of engine unit 15 (FIG. 3) through ventilation holes 73. Because a right side of the rear half of second crankcase block 20b is covered with clutch cover 37, space 75 in the rear half of second crankcase block 20b is defined between clutch cover 37 and inner casing 36a (FIG. 3).

Reinforcing ribs 76 are provided on the comb-like portion of rim 74. An oil pan 77 is provided below ventilation holes 73.

According to the above structure, as shown in FIG. 7, air in belt chamber 38 is guided into space 75 through ventilation holes 72 in inner casing 36a, and then discharged toward oil pan 77 through ventilation holes 73 in second crankcase block 20b. As a result, the air is discharged out of engine unit 15.

In the embodiment, the lower side of rim 74 of second crankcase block 20b is formed into a comb-like shape, thereby defining the plurality of slit-like ventilation holes 73. However, the shape of ventilation holes 73 is not limited to a slit, and may be an opening of another shape such as a circular opening. No limitation is imposed on the shape, size, and number of ventilation holes 73.

Next, cooling of CVT 17 is described.

Cooling of CVT 17

When engine unit 15 is actuated, primary sheave shaft 23a of CVT 17 is rotated. Accordingly, stationary sheave member 51a of primary sheave 51 is rotated, which rotates vanes 60. A suction force that guides air from closed casing 94 toward belt chamber 38 through intake duct 71 is generated and induces air from the outside into closed casing 94 through inlet port 61 (see FIG. 5(a)).

After passing through inlet port 61, air is first guided into air flow path 64a and then guided in the Z1 direction along partition wall 63 (see FIG. 6). Thus, air flows to the side of first casing member 95 and enters air flow path 64b.

As described above, first and second flow paths F1 and F2, which partially form air flow path 64b, form a curved flow path, and second and third flow paths F2 and F3, which partially form air flow path 64b, form another curved flow path. Hence, air guided into air flow path 64b flows meandering along partition walls 97a and 97b (see arrows in FIG. 5(b)). Meanwhile, a negative pressure generated near exhaust port 62 causes a portion of the air flowing in air flow path 64b to flow in the Z2 direction (see FIG. 6). In the course of flowing in the Z2 direction, the air passes through air filter 79. Accordingly, dust and the like in the air is filtered out through air filter 79. Hence, clean air is induced into air flow path 64c and flows toward exhaust port 62 while meandering along partition walls 98a and 98b in the same manner as in air flow path 64b (see arrows in FIG. 5(a)).

After reaching exhaust port 62, the air passes through intake duct 71 to be sucked into belt chamber 38. Air sucked into belt chamber 38 flows around and cools primary sheave 51, secondary sheave 52, and V-belt 55.

The air having cooled primary sheave 51, secondary sheave 52, and V-belt 55 is discharged out of belt chamber 38 through ventilation holes 72 in inner casing 36a, and flows into space 75 between inner casing 36a and second crankcase block 20b (see FIG. 7). Air in space 75 is discharged out of engine unit 15 through ventilation holes 73 in the lower portion of second crankcase block 20b. CVT 17 is continuously cooled by the air flow described above.

As described above, partition walls 98a and 98b and partition walls 97a and 97b form curved flow paths in closed casing 94. In the embodiment, flow path F1 is formed on one side of partition walls 98a and 97a and flow path F2 is formed on the other side such that flow directions of flow paths F1 and F2 are opposite from each other with partition walls 98a and 97a therebetween. Similarly, flow path F2 is formed on one side of partition walls 98b and 97b and flow path F3 is formed the other side such that flow directions of flow paths F2 and F3 are opposite from each other with partition walls 98b and 97b therebetween. Curved and especially compact flow paths are thus formed in closed casing 94. A long flow path within a confined space is thereby provided. Accordingly, noise produced by resin-block-type belt (V-belt) 55 in belt chamber 38 is effectively reduced in closed casing 94 before escaping outside.

From a viewpoint of flow smoothness in inducing and exhausting air without stagnation, the air flow path is preferably not curved. Nevertheless, in motorcycle 1, the flow path is intentionally curved in closed casing 94 to prevent rectilinear propagation of high-frequency sound waves. Accordingly, leakage of high-frequency sound waves produced by resin-block-type belt (V-belt) 55 to the outside of belt chamber 38 is prevented. Thus, according to motorcycle 1, noise produced by resin-block-type belt (V-belt) 55 is favorably suppressed.

In addition, in motorcycle 1, longitudinal ends 98c and 98d of partition walls 98a and 98b continue to the inner wall of closed casing 94 as viewed from the projecting directions (Z1 direction) of partition walls 98a and 98b. The other ends 98a and 98f are separated from the inner wall of closed casing 94. A U-shaped flow path is thereby formed in closed casing 94. By forming partition walls 97a and 97b in the similar manner to that of partition walls 98a and 98b, another U-shaped flow path is formed in closed casing 94. Thus, U-shaped flow paths are formed in closed casing 94 with a simple structure.

In closed casing 94 of motorcycle 1, a plurality of partition walls (partition walls 97a, 98a, 97b, and 98b) that form the U-shaped flow paths are provided. Air flow paths 64b and 64c thus have at least two U-shaped curves within closed casing 94 to form a serpentine flow path. Accordingly, motorcycle 1 suppresses leakage of high-frequency sound waves more effectively, thereby reducing noise produced by resin-block-type belt (V-belt) 55 more effectively. The shape of closed casing 94 is not limited to that of the embodiment, and the number and shape of partition walls are not limited to that of the embodiment. Three or more partition walls may be provided in closed casing 94.

In motorcycle 1, partition walls 97a and 97b are formed integrally with first casing member 95 and partition walls 98a and 98b are formed integrally with second casing member 96. Partition walls 97a, 97b, 98a, and 98b are thereby easily formed in closed casing 94.

Furthermore, according to the present embodiment, partition walls 97a, 97b, 98a, and 98b are each formed with a plate piece. A large length of air flow path 64 is thereby secured within closed casing 94 and closed casing 94 is formed compact.

In addition, closed casing 94 of motorcycle 1 is formed with two members; first casing member 95 and second casing member 96, which are aligned in the Z direction (the projecting direction of partition walls 97a, 97b, 98a, and 98b). This structure allows partition walls 97a, 97b, 98a, and 98b to be easily located within closed casing 94.

According to motorcycle 1, inlet port 61, exhaust port 62, and partition wall 63 are provided in second casing member 96. Partition wall 63 partitions a space in second casing member 96 into a space on the side of inlet port 61 and that on the side of exhaust port 62, and projects out of second casing member 96 toward the inside of closed casing 94 (in the Z1 direction). Hence, partition wall 63 forms air flow path 64 (air flow paths 64a, 64b, and 64c) that extends from inlet port 61 toward first casing member 95, turns back in first casing member 95 and then extends toward exhaust port 62. Consequently, air flow path 64 meanders not only in the X-Y plane shown in FIGS. 5(a) and 5(b) but also in the Z-X plane shown in FIG. 6; that is, air flow path 64 three-dimensionally meanders. Motorcycle 1 thereby suppresses leakage of high-frequency sound waves more effectively and reduces noise produced by resin-block-type belt (V-belt) 55 more effectively.

In this embodiment, the air passage is an intake passage that guides air into belt chamber 38. Air flow path 64 formed in closed casing 94 is upstream of belt chamber 38. Air filter 79 is provided between inlet port 61 and exhaust port 62 of air flow path 64. Thus, motorcycle 1 not only suppresses noise leakage through the inlet passage but also supplies clean air to belt chamber 38. This improves the durability of CVT 17.

In motorcycle 1, air filter 79 is located between inlet port 61 and exhaust port 62 of air flow path 64 as well as between first casing member 95 and second casing member 95 that form closed casing 94. By virtue of this arrangement, air filter 79 can be attached to motorcycle 1 easily even when air flow path 64 is formed into a complicated shape to suppress noise. This reduces work and cost necessary for maintenance.

The present inventor has conducted extensive studies and found that air guided by air-inducing vanes 60 into belt chamber 38 is a steady flow rather than a pulsating flow of air aspirated by engine 16, and that an air chamber for temporarily storing cooling air for CVT 17 thereby suppressing pulsation of the air flow is unnecessary. Based on this finding, an air chamber for storing cooling air of CVT 17 is not provided in motorcycle 1. This structure facilitates a large space for installing closed casing 94 inside body frame 2. Accordingly, air flow path 64 can be formed long, thereby suppressing noise produced by resin-block-type belt (V-belt) 55 more effectively.

In motorcycle 1, closed casing 94 is formed independently of air cleaner 43 for engine 16. A larger space for air flow path 64 is thereby secured as compared to a structure in which closed casing 94 is formed integrally with air cleaner 43 for engine 16. Accordingly, air flow path 64 can be formed long, thereby suppressing noise produced by resin-block-type belt (V-belt) 55 more effectively.

Inlet port 61 in closed casing 94 of motorcycle 1 is located below and covered by seat 3. Entry of rain, dust, or the like into closed casing 94 through inlet port 61 is thereby prevented. Inlet port 61 is located above pivot shaft 10 and thus is positioned away from the ground by a relatively large distance, where inlet port 61 less easily sucks water and dust. Hence, motorcycle 1 supplies clean air to belt chamber 38.

As shown in FIG. 2, according to the embodiment, closed casing 94 is located below seat 3, and intake duct 71 is connected with closed casing 94 at one end and connected with a front portion of transmission casing 36 at the other end. Intake duct 71 can thereby be formed long. Thus, according to motorcycle 1, air flow path 64 that is formed by intake duct 71 and partition walls 97a, 97b, 98a, and 98b can be formed long. This allows more effective suppression of noise produced by resin-block-type belt (v-belt) 55.

As shown in FIG. 2, according to the embodiment, exhaust pipe 41 of engine 16 extends rearward passing below transmission casing 36 of CVT 17. Interference between exhaust pipe 41 and closed casing 94 is thereby easily prevented. Hence, closed casing 94 can be formed large without being obstructed by exhaust pipe 41. A large space for closed casing 94 inside body frame 2 is thereby secured. According to motorcycle 1, air flow path 64 can be formed long, thereby suppressing noise produced by resin-block-type belt (V-belt) 55 more effectively.

According to the embodiment, vanes 60 for blowing air are formed on the outer side of stationary sheave member 51a of primary sheave 51. Air from the outside is thereby guided into belt chamber 38 smoothly even when the air passage is formed long as in the case of the invention. Thus, according to motorcycle 1, suppression of noise and improvement of cooling capability of CVT 17 are attained.

An example in which an air passage is embodied as an intake passage for guiding air to belt chamber 38 has been described. However, the air passage according to the invention is not limited to such an intake passage, and may be an exhaust passage. When the air passage is embodied as the exhaust passage, transmission casing 36 preferably has, e.g., an additional intake duct or intake opening. Even when constructed as described above, the exhaust passage serving as the air passage according to the invention can be formed compact and long. In addition, the exhaust passage serving as the air passage according to the invention can be formed into a serpentine flow path. Accordingly, leakage of noise produced by V-belt 51 from belt chamber 38 in transmission casing 36 through the exhaust passage can be prevented. Thus, even when the structure is adopted, motorcycle 1 is capable of favorably suppressing noise produced by resin-block-type belt (V-belt) 55.

In the embodiment, the "plate piece" forming each of partition walls 98a, 98b, 97a, and 97b has a smooth curved surface. However, a shape of the "plate piece" is not limited to those shown in FIGS. 5(a) and 5(b). For example, the plate piece may have an uneven surface as shown in FIG. 8(a). Alternatively, the plate piece may have a hollow therein as shown in FIG. 8(b). In the embodiment, partition walls 98a and 98b are formed integrally with second casing member 96. Alternatively, partition walls 98a and 98b may be formed independently of second casing member 96, and fixed together by adhesion or a like method. Similarly, partition walls 97a and 97b may be formed independently of first casing member 95, or partition wall 63 may be formed independently of second casing member 96.

According to the invention, noise produced by resin-block-type belt (V-belt) 55 of a saddle-ride-type other than motorcycle 1 can also be suppressed. According to the invention, a long air passage is secured within a small space. This is particularly significant to vehicles such as motorcycle 1, for which widening of its vehicle width is unfavorable.

An example structure has been described in which transmission casing 36 has no sound absorber therein. However, the invention does not exclude installation of a sound absorber on an inner surface of transmission casing 36. Hence, a sound absorber can be installed on, e.g., an inner surface of transmission casing 36 to thereby suppress noise more effectively.

As described above, the present invention is useful for straddle-type vehicles such as a motorcycle.

While particular embodiments of the invention have been described, it should be understood that these embodiments are exemplary, and not restrictive. Various modifications will be apparent to those of skill in the art and are within the scope of the present invention as set forth in the following claims.

The invention claimed is:

1. A straddle-type vehicle comprising:
   an engine unit having an engine, a continuously variable transmission (CVT) having a resin-block belt, and a transmission casing defining a belt chamber for accommodating the CVT; and
   an air passage for guiding air into or venting air out of the belt chamber;
   wherein the air passage includes a closed casing, in which an inlet port and an exhaust port are formed, and at least one first partition projecting from a first inner wall of the closed casing toward an inside of the closed casing and having at least one second partition projecting in a direction intersecting with the at least one first partition;

flow paths are formed on each side of the intersecting partitions, wherein flow directions of the flow paths are opposite from each other; and the flow paths form a curved flow path that runs from the inlet port to the exhaust port in the closed casing.

2. The straddle-type vehicle according to claim 1,
wherein one longitudinal end of the at least one first partition is connected with the first inner wall of the casing and the other longitudinal end of the at least one first partition is separated from the first inner wall of the casing; and a first flow path that runs from the one end to the other end of the at least one first partition is formed on one side of the at least one first partition, a second flow path that runs from the other end to the one end of the at least one first partition is formed on another side of the at least one first partition, and the first and second flow paths form a U-shaped flow path.

3. The straddle-type vehicle according to claim 1, wherein the intersecting partitions form a serpentine flow path in the closed casing.

4. The straddle-type vehicle according to claim 1, wherein the closed casing and the intersecting partitions are formed integrally with each other.

5. The straddle-type vehicle according to claim 1, wherein the at least one first partition is a plate piece.

6. The straddle-type vehicle according to claim 1, wherein the closed casing is formed with a plurality of casing members aligned in the projecting direction of the at least one first partition.

7. The straddle-type vehicle according to claim 1, wherein the closed casing is formed with a dish-shaped first casing member and a dish-shaped second casing member opposing each other in the projecting direction of the at least one first partition, the second casing member comprising:

the inlet port,
the exhaust port, and
at least one third partition wall that partitions between the inlet port and the exhaust port such that air sucked through the inlet port is first guided to a side of the first casing member and then discharged out through the exhaust port.

8. The straddle-type vehicle according to claim 7,
wherein the air passage is an intake passage for guiding air into the belt chamber; and an air filter is provided at a position between the first casing member and the second casing member in the closed casing as well as between the inlet port and the exhaust port.

9. The straddle-type vehicle according to claim 1, wherein the air passage is an intake passage for guiding air to the belt chamber.

10. The straddle-type vehicle according to claim 9, wherein the intake passage has no air chamber for temporarily storing outside air.

11. The straddle-type vehicle according to claim 9, further comprising an engine air cleaner for cleaning air to be guided to the engine,
wherein the closed casing is formed independently of the engine air cleaner.

12. The straddle-type vehicle according to claim 9, further comprising a seat for supporting a passenger,
wherein the inlet port is below the seat.

13. The straddle-type vehicle according to claim 9, further comprising:
a body frame;
a rear arm supporting a rear wheel; and
a pivot shaft pivotally supporting the rear arm on the body frame,
wherein the inlet port is at a position higher than the pivot shaft.

14. A straddle-type vehicle according to claim 1, the straddle-type vehicle being a motorcycle.

* * * * *